United States Patent

[11] 3,631,672

[72] Inventors Richard W. Gentile
 Schenectady, N.Y.;
 Wayne B. Moyer, deceased, late of Schenectady, N.Y. by Carolyn Moyer, executrix
[21] Appl. No. 849,272
[22] Filed Aug. 4, 1969
[45] Patented Jan. 4, 1972
[73] Assignee General Electric Company

[54] EDUCTOR COOLED GAS TURBINE CASING
 10 Claims, 3 Drawing Figs.
[52] U.S. Cl. .................................................. 60/39.66,
 415/116, 415/175
[51] Int. Cl. .................................................. F02c 7/18
[50] Field of Search .......................................... 60/39.66;
 415/115, 116, 175, 177

[56] References Cited
 UNITED STATES PATENTS
 2,591,399  4/1952  Buckland ............... 60/39.66

| | | | |
|---|---|---|---|
| 2,840,986 | 7/1958 | Davies | 60/39.66 |
| 3,043,561 | 7/1962 | Scheper | 415/115 |
| 2,372,467 | 3/1945 | Alford | 415/175 |
| 2,625,009 | 1/1953 | Leggett | 60/39.66 |
| 2,652,216 | 9/1953 | Hoffman | 60/39.66 |
| 2,940,258 | 6/1960 | Lombard | 415/175 |

*Primary Examiner*—Douglas Hart
*Attorneys*—William C. Crutcher, Frank L. Neuhauser, Oscar B. Waddell and Joseph B. Forman ABSTRACT: A cooling arrangement for a gas turbine power plant is disclosed in which cycle air is used in combination with atmospheric air as the cooling fluid. A plurality of eductor tubes with nozzles are disposed about the turbine casing and serve to direct pressurized cycle air into associated cooling holes. The cycle air gives momentum to the secondary atmospheric air and the cooling medium passes through the holes, removing heat therefrom. The use of cycle air in combination with atmospheric air also provides for compartment ventilation in a gas turbine of the enclosed type.

PATENTED JAN 4 1972

3,631,672

INVENTORS:
RICHARD W. GENTILE,
WAYNE B. MOYER, DECEASED,
BY CAROLYN S. MOYER,
EXECUTRIX.

BY *W. C. Cutcher*
THEIR ATTORNEY.

EDUCTOR COOLED GAS TURBINE CASING

BACKGROUND OF THE INVENTION

In general, this invention relates to an improved cooling arrangement for high temperature elastic fluid machines. More particularly, it relates to a cooling arrangement whereby the turbine casing and exhaust frame of a gas turbine power plant are cooled by using pressurized cycle air in combination with atmospheric or secondary air.

It is well known that the efficiency and output of an elastic fluid machine, in particular a gas turbine power plant, can be increased by increasing the operating temperature of the elastic fluid. Of course, as the temperature of the elastic fluid increases, the structural elements of the machine must be redesigned and/or cooled in order to maintain close tolerances, and the like.

One of the structural elements which usually requires a cooling means if it is to operate efficiently at high temperature, is the turbine casing or shell. Ideally, a turbine shell cooling arrangement would be one that allows ease of construction, efficient and effective heat exchange characteristics, economy of manufacture, and simplicity and reliability during operation. Another such element which may require a cooling means is the exhaust frame. Of course, it will be understood that other elements may be cooled and the two mentioned are by way of illustration only.

Prior to the present invention, one method of cooling a turbine shell was with the use of a closed circuit water cooled system. This system was very detailed in design and required many collateral elements other than just the cooling jacket around the shell. Difficulties are encountered at casing connecting joints. A further problem associated with a water cooled system was that high thermal stresses were induced in the shell, thus precluding the choice of lower cost casing materials while adding to the clearance problem. It would be desirable to simplify the design of the cooling system and at the same time provide uniform cooling.

It is well known that other elements within a gas turbine power plant may be cooled by the circulation of cycle air. A slight loss in efficiency does result from the use of cycle air, but the advantages more than compensate for the loss in efficiency. Being a simple and economic method for cooling gas turbine elements, it would be desirable to cool the turbine casing in a like manner, which utilizes cycle air and atmospheric air to provide the necessary pressure rise and flow to accomplish complete cooling of the hot casing areas of the gas turbine.

Power plants of this variety which are installed outdoors usually are completely enclosed in order to provide protection from harsh weather conditions. Between the casing areas of the power plant and the outer cover, there are formed various compartments or air spaces. Air is allowed to enter the compartments in order to act as a heat exchange fluid, removing some of the heat generated by the hot casings, but, as a result of the heat exchange, it is necessary to provide a ventilation means so as to establish effective heat exchange between the hot casing areas and circulating atmospheric air.

Accordingly, the primary object of the present invention is to utilize cycle air in combination with atmospheric air as the cooling fluid for the hot turbine casing.

Another object is to provide a cooling system which is simple in operation and design.

Still another object is to provide uniform cooling about the hot casing areas.

Still a further object of the invention is to provide means for improved compartment ventilation.

SUMMARY OF THE INVENTION

Briefly stated, the invention is practiced by providing cooling holes in a gas turbine casing and a plurality of eductor tube with nozzles about the circumference of the casing positioned so as to discharge a pressurized fluid into the cooling holes. The pressurized fluid mixes with the secondary atmospheric air surrounding the casing, thus causing the cooling mixture to flow through the holes which results in heat exchange between the casing and the cooling fluid flow.

DRAWING

These and many other objects of the invention will become apparent by reference to the following description, taken in connection with the accompanying drawing, in which.

DESCRIPTION OF THE PREFERRED EMBODIMENT

Figure 1:
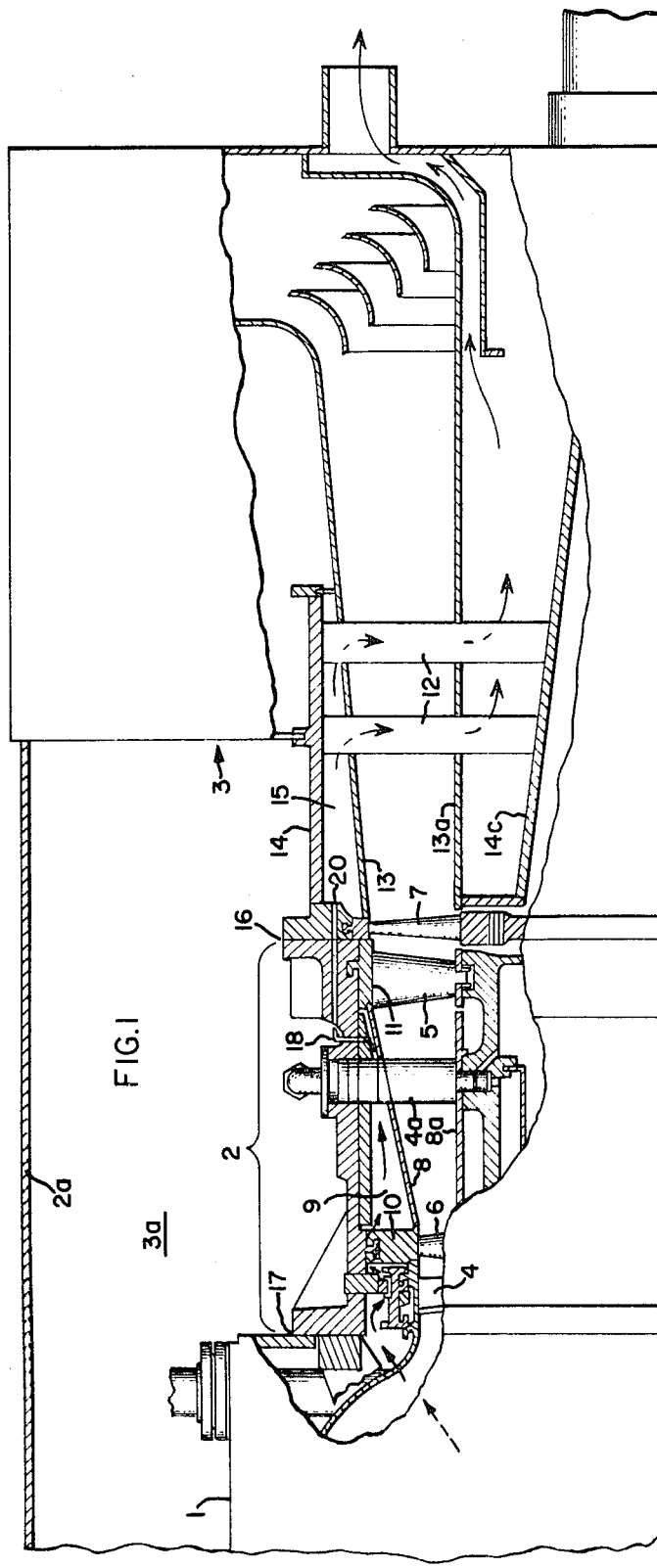
FIG. 1 is a cutaway view, partly in section, of that part of a gas turbine plant which embodies the present invention.

R Referring now to FIG. 1 of the drawing, that part of an axial flow gas turbine is shown which is material to the present invention. It should be recognized that although the elements shown are those of a gas turbine power plant, other types of elastic fluid machines could be adapted to include the concept of the present invention.

The construction and operation of an axial flow gas turbine are well known in the art. Hence, only a general description of those elements not material to the present invention will be made.

FIG. 1 shows three sections of the gas turbine beginning with the combustion chamber wrapper indicated as 1, the turbine shell or casing 2, its axial length indicated by the bracket, and the exhaust frame section generally indicated as 3. Not shown is the compressor section. Surrounding the gas turbine casing in general is outer cover 2a which protects the gas turbine components from inclement conditions. It forms, in combination with the power plant an outer compartment or airspace 3a which is open to the atmosphere at various points. Of course, it will be appreciated that an outer cover is not an essential working element of a gas turbine but that it is only employed when conditions warrant. Before passing to a description of the internal elements in the gas turbine, it should be noted that it is from this outer compartment which communicates with the atmosphere that the secondary air is derived for the operation of the eductor cooling system. Of course, if the outer cover is not utilized, the secondary air will be derived directly from the atmosphere. This will be better understood when referring to the operation of the invention. The structure surrounding turbine will hereinafter be referred to as the gas turbine casing.

The cutaway portion of FIG. 1 shows the elements within the turbine section 2 and exhaust frame section 3 including two nozzles 4 and 5 which direct the motive fluid flow into the buckets 6 and 7 of a two-stage turbine. Buckets 6 and 7 are of the type which are mounted circumferentially on a rotor wheel so as to rotate about the axis of the gas turbine when a motive fluid impinges upon their surface. Circumferential flow guides 8, 8a serve two main function; first, to direct the motive fluid as it leaves the first turbine stage and proceeds past the diaphragm assembly 4a to the second nozzle 5, and second, to form an annular internal compartment 9. The inner compartment 9 is formed in conjunction with the upper flow guide 8, two shroud members 10, 11, and the turbine casing 2. Compartment 9 has means to admit a pressurized fluid generally consisting of clean cycle air which serves as the primary fluid for the eductor cooling system. Although the origin is not material to the present invention it should be noted that the pressurized fluid may be derived from several different sources. One such source is compressor extraction air which is bled from a stage of the compressor and direction to compartment 9. In FIG. 1, a possible flow path for "pressurized air" from the combustion chamber wrapper 1, and hence from the turbine compressor stage to the compartment 9, is indicated by a plurality of arrows. Pressure differentials, as well as segmented seals of the type shown in U.S. Pat. Nos. 3,043,561 and 3,412,977 granted to Scheper, Jr. and Moyer et al., respectively, motivate and allow pressurized air to flow from the compressor stage to the compartment 9. It will be appreciated that cycle air may serve as the pressurized fluid although it is not limited to this source, and, in fact, an external source of pressurized fluid could be provided. Cycle air from the compressor stage or from an external source may be drawn through an external pipe which is attached at one end to the source of the pressurized fluid and attached at the other end to ring manifold 32 which girds the turbine shell 2. This ring manifold will then externally perform the same function as internal compartment 9 inside the turbine shell.

The exhaust frame section 3 is structurally composed of struts 12 which are attached to an outer barrel 14 and an inner barrel 14c. Forming the exhaust diffuser are circumferential exhaust sidewalls 13, 13a, constructed similarly to flow guides 8, 8a, and which are located in the exhaust frame section 3 between the inner and outer barrels in order to direct the exhaust gases from the last stage of turbine buckets 7 to the atmosphere or to a heat recovery unit should one be employed. Similar to compartment 9 is circumferential annular exhaust compartment 15 which is formed by the upper exhaust sidewall 13 and the outer barrel 14. One end of strut 12 is open to exhaust compartment 15 for the passage therethrough the cooling medium as will be more fully understood under the operation of the invention. The opposite ends of struts 12 are open and communicate with the atmosphere; that is, after the cooling medium passes through struts 12, it is then eventually directed to the atmosphere as seen by the arrows in FIG. 1.

The exhaust frame section 3 is connected to the turbine casing 2 at an axial position indicated as 16. In a like manner, the combustion chamber wrapper 1 is connected to the turbine casing 2 at an axial position 17.

Figure 3:
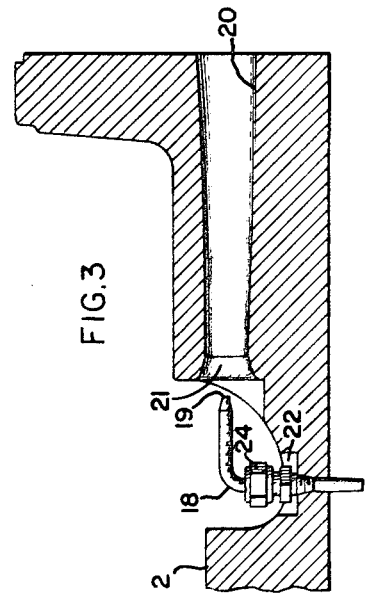
FIG. 3 shows part of the turbine casing with an alternate embodiment.
Figure 2:
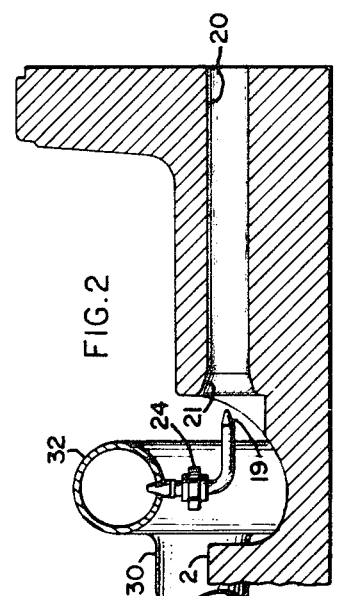
FIG. 2 shows part of the turbine casing with the details of the present invention.

Referring now to both FIGS. 1 and 3, wherein like numbers represent like elements, an eductor tube 18 is shown as disposed in the turbine casing 2. It is noted that a plurality of eductors are positioned about the circumference of the turbine casing in order to provide adequate and uniform cooling. The eductor tube 18 is constructed of small diameter tubing with a 90° bend. On one end of tube 18 is a simple converging nozzle 19 which is generally directed in an axial direction; that is, it is directed in the same general direction as is the turbine casing 2 and outer barrel 14. The end of eductor tube 18 opposite the nozzle 19 opens into compartment 9 where it receives the pressurized fluid in order to direct it into the cooling holes 20.

The nozzle 19 of eductor tube 18 is pointed into axial cooling hole 20 which extends an axial distance through a portion of the turbine casing 2 and a portion of the exhaust barrel 14, passing across the connecting joint therebetween. The entrance to cooling hole 20 is generally rounded as indicated at 21 in order to facilitate the mixing and smooth flow of the pressurized fluid and secondary fluid. It will be appreciated that the portion of turbine casing or exhaust casing, having coolant holes 20, will necessarily be of sufficient thickness to accommodate said holes without causing unwanted structural weakness. The cooling holes may be cast or machined directly into the casing walls.

As shown by FIG. 3, the eductor tube 18 is mounted in a recess or well 22 on the turbine casing 2. The reason for mounting the eductor tubes in well 22 is to minimize the casing thickness required to accommodate cooling holes 20. Tube 18 is secured in its proper position by any suitable means, for example, by nut 24.

As is shown in the embodiment of FIG. 3, the cooling holes 20 may have sloping walls in order to form a diffuser. The advantage of having such a construction will be further described in the operation of the invention, but in general better cooling results from using a diffuser section.

OPERATION

The operation of the present invention is as follows. A multiplicity of eductor tubes with nozzles are uniformly spaced around the turbine casing. A source of pressurized fluid, air in the principal description, is available which may be comprised of clean compressor extraction air. The pressurized fluid is directed to chamber 9 or ring manifold 32 from where it flows through eductor tube 18. As the pressurized fluid passes through nozzle 19, it provides the required momentum of a high velocity stream to accelerate and carry a secondary fluid, atmospheric air in the principal description, through the cooling holes against a small pressure head. It will be appreciated that by utilizing a small amount of pressurized fluid from the cycle air in such a manner, a great amount of total cooling air flow is realized as compared to the design where cycle air alone is utilized. Only 10-15 percent of the total cooling medium is obtained from cycle fluid, thus maintaining a high cycle efficiency while greatly increasing cooling characteristics. As the cooling medium passes through the cooling holes, it removes heat from the casing material. The amount of flow through the coolant holes, of course, determines the amount of cooling. By increasing the diameter of the eductor tubes, a greater amount of primary air would mix with secondary fluid, thereby causing a greater flow rate which increases the cooling rate. Another method of increasing the flow rate is to incorporate a diffuser, as previously mentioned, which will result in the additional pressure recovery needed to increase the flow rate. The rounded corners at the entrance to cooling holes 19 provide an efficient transition surface when the pressurized fluid is mixing with the secondary fluid and entering the coolant hole. After the cooling medium passes through the cooling holes, it enters chamber 15 where it cools both the outer barrel 14 and diffuser sidewall 13 before passing through and cooling struts 12. After passing through the struts, the cooling medium is directed by appropriate means to the atmosphere, cooling other elements in its path. It should be noted that the cooling medium may be exhausted into the atmosphere at an earlier point if such operation is desired.

As a direct benefit of using atmospheric air as the secondary fluid, outer compartment ventilation is realized. In the embodiment shown, the outer compartment is formed by the cooperation of a weatherproof cover and the turbine casings as previously mentioned. As the pressurized fluid exhausts from the nozzle and into the cooling hole, it draws secondary air with it, thus serving to ventilate the compartment.

Thus, it will be appreciated that a cooling system for a gas turbine has been described which utilizes a minimum of cycle fluid and employs no moving parts. A simple eductor cooling system operates to accomplish the complete cooling of the hot casing areas of the gas turbine while at the same time providing compartment ventilation should an outer covering be utilized.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What we claim as new and desire to secure by Letters Patent of the United States is:

1. An eductor cooled gas turbine comprising:
   a gas turbine casing including a solid annular wall portion of substantial thickness and axial length,
   a plurality of cooling holes about the circumference of said casing extending through said casing inside said wall portion thickness along the length thereof and open at each end,
   a source of pressurized fluid, and
   a plurality of eductor tubes disposed about the circumference of said casing and connected to said source so as to direct said pressurized fluid into one end of said cooling holes.

2. A gas turbine according to claim 1 in which said pressurized fluid source comprises compressed cycle air extracted from the compressor section of said gas turbine.

3. A gas turbine according to claim 1 in which said pressurized source comprises fluid from an external source.

4. A gas turbine according to claim 1 in which said cooling holes extend through first and second portions of said casing disposed on either side of a connecting joint and communicate with the atmosphere at both ends thereof.

5. A gas turbine according to claim 1 in which said eductor tubes have a nozzle portion on one end so that said pressurized fluid will provide the momentum to accelerate a secondary fluid surrounding said casing through said cooling holes.

6. A gas turbine according to claim 1 in which said cooling holes have rounded entrances to facilitate the mixing of said secondary fluid with said pressurized fluid.

7. A gas turbine according to claim 1 in which said cooling holes have a diffuser section for additional pressure recovery.

8. A gas turbine according to claim 1 in which one end of said cooling holes communicates with hollow struts supporting an exhaust frame so that said struts are cooled by the flow therethrough the cooling medium.

9. A gas turbine according to claim 8 in which said cooling medium flows through said struts and thereafter exhausts to the atmosphere.

10. A gas turbine according to claim 1 which is surrounded by an outer covering for protection from inclement weather and in which said eductor cooling provides turbine compartment ventilation.

* * * * *